US007421613B2

(12) United States Patent
Nakaya

(10) Patent No.: US 7,421,613 B2
(45) Date of Patent: Sep. 2, 2008

(54) METHOD AND SYSTEM FOR MANAGING OF JOB EXECUTION

(75) Inventor: Hironobu Nakaya, Tokyo (JM)

(73) Assignee: Hitachi, Ltd., Tokyo (JP)

( * ) Notice: Subject to any disclaimer, the term of this patent is extended or adjusted under 35 U.S.C. 154(b) by 564 days.

(21) Appl. No.: 10/928,011

(22) Filed: Aug. 27, 2004

(65) Prior Publication Data
US 2005/0289385 A1    Dec. 29, 2005

(30) Foreign Application Priority Data
May 26, 2004    (JP)    ............... 2004-156024

(51) Int. Cl.
*G06F 11/00*    (2006.01)
(52) U.S. Cl. .................... 714/6; 714/4; 714/8
(58) Field of Classification Search .............. 714/4, 714/6, 8
See application file for complete search history.

(56) References Cited

U.S. PATENT DOCUMENTS

| 6,507,883 | B1 | 1/2003 | Bello et al. |
| 6,529,995 | B1 * | 3/2003 | Shepherd .................... 711/114 |
| 6,662,268 | B1 | 12/2003 | McBrearty et al. |
| 2004/0153728 | A1 | 8/2004 | Suzuki et al. |
| 2004/0193969 | A1 * | 9/2004 | Nemoto et al. ............... 714/100 |

FOREIGN PATENT DOCUMENTS

JP    11-353284    12/1999

* cited by examiner

*Primary Examiner*—Robert Beausoliel
*Assistant Examiner*—Charles Ehne
(74) *Attorney, Agent, or Firm*—Townsend and Townsend and Crew LLP

(57) ABSTRACT

The system of the present invention is devised so that the execution of all jobs that access all of the logical volumes containing a physical volume in which trouble has occurred can be stopped at least until there is a recovery from this trouble. The schedule management part manages the timing at which a given job registered in the client is executed by the service server. The execution managing part performs the actual exchange of data with the service server. This part performs management of the data format of the data that is exchanged with the service server, address management of the service server that is the partner in data exchange, control of the circuit connections, control relating to data transmission and reception, and the like. The trouble recovery management part waits until receiving a notification from the managing server that there has been a recovery from the trouble occurring in a logical volume of the storage device. When the trouble recovery notification is received from the managing server, the trouble recovery management part writes an indication of recovery from this trouble into the trouble information table.

10 Claims, 10 Drawing Sheets

JOB INFORMATION TABLE 21

| JOB NAME | STATE | EXECUTION COMMAND | RESOURCE NAME |
|---|---|---|---|
| JOB 1 | NOT YET EXECUTED | EXECUTION COMMAND | LOGICAL VOLUME 2 |
| JOB 2 | IN EXECUTION | EXECUTION COMMAND | LOGICAL VOLUME 1 |
| JOB 3 | AWAITING TROUBLE RECOVERY | EXECUTION COMMAND | LOGICAL VOLUME 2 |
| JOB 4 | AWAITING SCHEDULING | EXECUTION COMMAND | LOGICAL VOLUME 1 |
| JOB 5 | AWAITING TROUBLE RECOVERY | EXECUTION COMMAND | LOGICAL VOLUME 3 |
| ⋮ | ⋮ | ⋮ | ⋮ |
| 51 | 53 | 55 | 57 |

FIG. 2

TROUBLE INFORMATION TABLE 23

| RESOURCE NAME |
|---|
| LOGICAL VOLUME 2 |
| LOGICAL VOLUME 3 |
| ⋮ |

FIG. 3

RECEIVED INFORMATION TABLE 29

| RESOURCE NAME | CLIENT INFORMATION | |
|---|---|---|
| LOGICAL VOLUME 2 | IP ADDRESS 1 | PORT NO. 1 |
| | IP ADDRESS 2 | PORT NO. 2 |
| LOGICAL VOLUME 3 | IP ADDRESS 1 | PORT NO. 1 |
| | IP ADDRESS 3 | PORT NO. 3 |
| | IP ADDRESS 4 | PORT NO. 4 |
| ⋮ | ⋮ | |

CONSTRUCTION INFORMATION TABLE 31 (35)

| PHYSICAL VOLUME NAME | STATE | LOGICAL VOLUME NAME |
|---|---|---|
| PHYSICAL VOLUME 1 | NORMAL | LOGICAL VOLUME 1 |
| PHYSICAL VOLUME 2 | TROUBLE | LOGICAL VOLUME 2 |
| | | LOGICAL VOLUME 3 |
| PHYSICAL VOLUME 3 | NORMAL | LOGICAL VOLUME 2 |
| | | LOGICAL VOLUME 3 |
| | | LOGICAL VOLUME 4 |
| PHYSICAL VOLUME 4 | NORMAL | LOGICAL VOLUME 1 |
| | | LOGICAL VOLUME 3 |
| ⋮ | ⋮ | ⋮ |

METHOD AND SYSTEM FOR MANAGING OF JOB EXECUTION

BACKGROUND OF THE INVENTION

1. Field of the Invention

The present invention relates to a job execution managing method and job execution managing system comprising a storage device which has a plurality of physical volumes, and which is used with the respective physical volumes respectively assigned to a plurality of logical volumes, and an information processing device which instructs the abovementioned storage device to execute jobs.

2. Description of the Related Art

In the past, an efficient job re-execution technique has been proposed which uses a load dispersion function in cases where jobs are re-executed because of computer trouble in a computer system constructed from a plurality of computers. In this job re-execution technique, when a job that was in progress in the computer in which trouble occurred is re-executed, efficient execution and an early resolution of the effects of computer trouble are realized by judging the computer that is used to re-execute the job that is the object of re-execution from load information for the computers that are candidates for performing re-execution and information relating to the conditions of execution up to the time that the job that is the object of re-execution was interrupted (for example, see Japanese Patent Application Laid-Open No. 11-353284).

In a storage device, there may be cases in which the plurality of physical volumes installed in the storage device are assigned to a plurality of logical volumes and used. In such cases, if trouble occurs in one of the physical volumes, there may be cases in which the clients of the client server system using the storage device cannot recognize that trouble has occurred in this physical volume, and can only recognize that trouble has occurred in the logical volume containing this physical volume.

In such cases, when the execution of a job using the logical volume containing the physical volume in which trouble has occurred fails, the client can recognize that the execution of this job has failed; accordingly, the client can stop the execution of this job. However, in regard to the execution of other jobs in a state awaiting execution using another logical volume containing the physical volume in which the abovementioned trouble has occurred, even though this execution fails as a result, the client cannot recognize the trouble involved in this other logical volume; accordingly, there is no method for stopping the execution of these other jobs that are in a state awaiting execution. Consequently, the following problem arises: namely, jobs that will fail are needlessly executed.

SUMMARY OF THE INVENTION

Accordingly, it is an object of the present invention to make it possible to stop the execution of all jobs accessing all of the logical volumes that include the physical volume in which trouble has occurred, at least until there is a recovery from the trouble, in a system comprising a storage device which is used with each of a plurality of physical volumes being respectively assigned to a plurality of logical volumes, and an information processing device that instructs the abovementioned storage device to execute jobs.

The job execution managing system according to a first aspect of the present invention comprises a storage device which has a plurality of physical volumes, and which is used with the respective physical volumes respectively assigned to a plurality of logical volumes, and an information processing device which instructs the abovementioned storage device to execute jobs. This system has a trouble detection part which detects whether or not trouble has occurred in the abovementioned respective logical volumes, and a logical volume searching part which is devised so that in cases where it is detected by the abovementioned trouble detection part that trouble has occurred in the logical volume used in the execution of the job as a result of the execution of a certain job being instructed by the abovementioned information processing device, a search is made for other logical volumes to which the physical volume contained in the abovementioned logical volume has been assigned.

In a preferred embodiment according to this first aspect of the present invention, the job execution managing system further comprises a job searching part which searches in order to ascertain whether or not there is another job using the logical volume found by the abovementioned logical volume searching part, and an execution stop notification part which is devised so that in cases where the abovementioned job searching part finds another job, this execution stop notification part notifies the abovementioned information processing device of the stopping of the execution of this other job.

In a separate embodiment from the above, the job execution managing system further comprises a trouble recovery detection part which detects whether or not there has been a recovery from the trouble occurring in the abovementioned logical volume, and a execution stop release notification part which is devised so that in cases where the abovementioned trouble recovery detection part detects trouble recovery of the abovementioned logical volume, this execution stop release notification part notifies the abovementioned information processing device of the release of the stopping of the execution of the abovementioned other job.

Furthermore, in a separate embodiment from the above, the abovementioned information processing device includes a client and a server, and commands for the abovementioned job execution are sent to the storage device from the client via the server.

Furthermore, in a separate embodiment from the above, the abovementioned trouble detection part, the abovementioned job searching part and the abovementioned execution stop notification part are all installed in the server.

Furthermore, in a separate embodiment from the above, a notification from the abovementioned execution stop notification part is sent to the client.

Furthermore, in a separate embodiment from the above, the abovementioned trouble recovery detection part and the abovementioned execution stop release notification part are installed in the server.

Furthermore, in a separate embodiment from the above, a notification from the abovementioned execution stop release notification part is sent to the client.

The job execution managing method according to a second aspect of the present invention comprises a storage device which has a plurality of physical volumes, and which is used with the respective physical volumes respectively assigned to a plurality of logical volumes, and an information processing device which instructs the abovementioned storage device to execute jobs. This method has a step which detects whether or not trouble has occurred in the abovementioned respective logical volumes, and a step which is devised so that in cases where it is detected in the abovementioned trouble detection step that trouble has occurred in the logical volume used in the execution of the job as a result of the execution of a certain job being instructed by the abovementioned information processing device, a search is made for other logical volumes to which the physical volume contained in the abovementioned logical volume has been assigned.

In a preferred embodiment according to this second aspect of the present invention, the method further includes a step in which a search is made in order to ascertain whether or not there are other jobs using the logical volume found in the abovementioned logical volume searching step, and a step which is devised so that in cases where other jobs are found in the abovementioned job searching step, the information processing device is notified of the stopping of the execution of these other jobs.

In a separate embodiment from the above, the method further includes a step which detects whether or not there has been a recovery from the trouble occurring in the abovementioned logical volume, and a step which is devised so that in cases where trouble recovery of the abovementioned of the logical volume is detected in the abovementioned trouble recovery detection step, the abovementioned information processing device is notified of the release of the stopping of the execution of the abovementioned other jobs.

In a system comprising a storage device which has a plurality of physical volumes, and which is used with the respective physical volumes respectively assigned to a plurality of logical volumes, and an information processing device which instructs the abovementioned storage device to execute jobs, the present invention makes it possible to stop the execution of all of the jobs that access all of the logical volumes containing a physical volume in which trouble has occurred, at least until there is a recovery from the abovementioned trouble.

BRIEF DESCRIPTION OF THE DRAWINGS

FIG. 2 is an explanatory diagram showing one example of the job information table possessed by the client described in FIG. 1;

FIG. 3 is an explanatory diagram showing one example of the reception information table possessed by the client described in FIG. 1;

FIG. 4 is an explanatory diagram showing one example of the reception information table possessed by the client described in FIG. 1;

FIG. 5 is an explanatory diagram which shows one example of the construction information table possessed by the managing server described in FIG. 1, and one example of the construction information table possessed by the service server described in FIG. 1;

DESCRIPTION OF THE PREFERRED EMBODIMENTS

Embodiments of the present invention will be described in detail below with reference to the attached figures.

Figure 1:
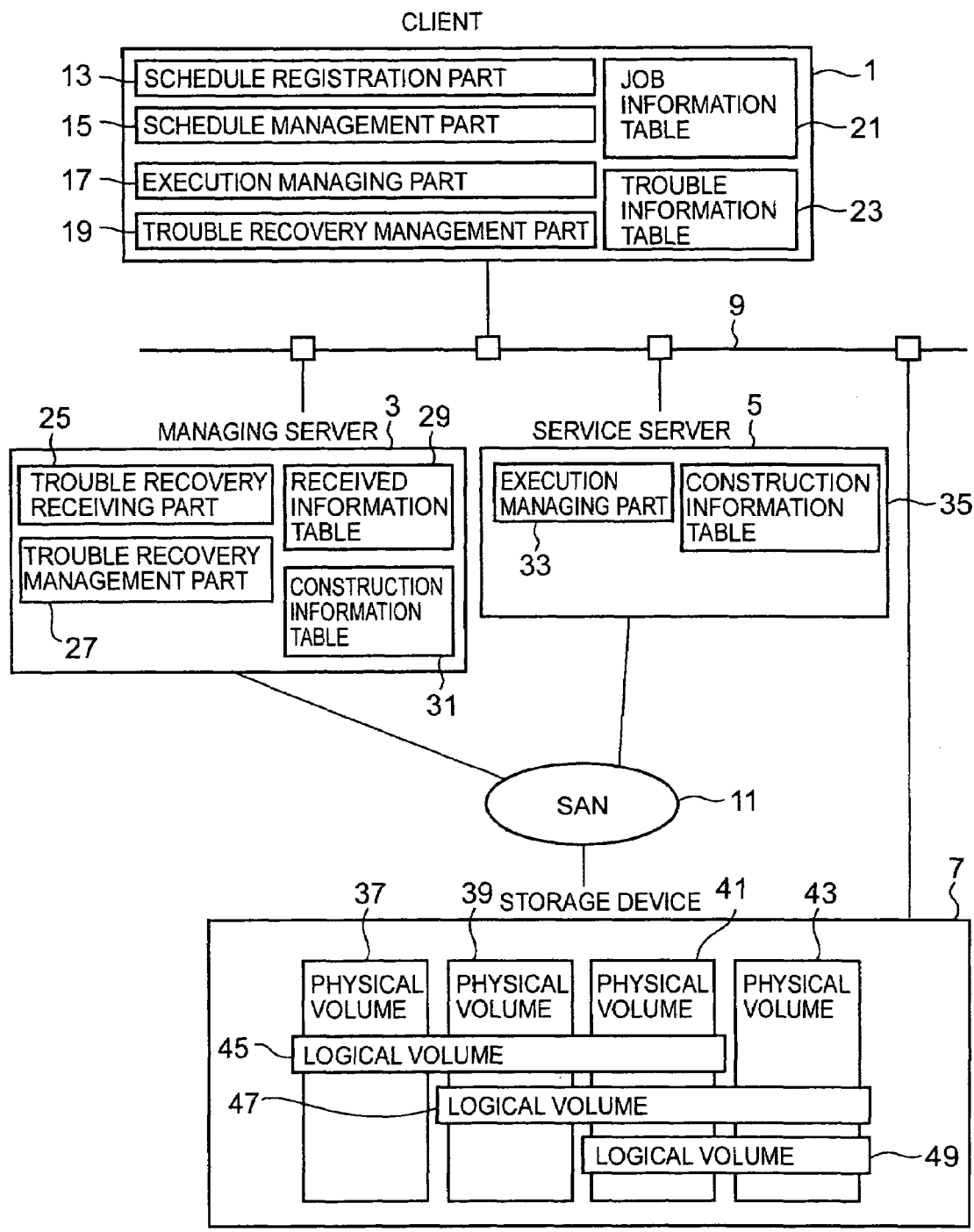
FIG. 1 is a block diagram of an information processing system using a job scheduling system constituting one working configuration of the present invention.

FIG. 1 is a block diagram which shows the overall construction of an information processing system in which a job scheduling system constituting one embodiment of the present invention is used.

As is shown in FIG. 1, this information processing system comprises a client machine (client) 1, a managing server 3, a service server 5, and a storage device 7. In the actual information processing system, the client is not the single machine indicated by the symbol 1; rather, numerous clients exist. However, for convenience of description and graphic illustration, only a single client indicated by the symbol 1 is taken as an example. The exchange of information between the client 1 and the managing server 3, between the client 1 and the service server 5, between the managing server 3 and the service server 5, and between the client 1 and the storage device 7, is accomplished in all cases via a LAN (local area network) 9. Furthermore, the exchange of information between the managing server 3 and the storage device 7, and between the service server 5 and the storage device 7, is accomplished in both cases via a SAN (storage area network) 11.

Next, the internal constructions of the respective parts will be described in detail.

The client 1 comprises a schedule registration part 13, a schedule management part 15, a client execution managing part (execution managing part) 17, a trouble recovery management part 19, a job information table 21, and a trouble information table 23.

The schedule registration part 13 is used when a schedule of jobs that are subjected to certain processing is registered in the client 1. Here, the term "job" refers to a case in which a command to perform an operation on a physical volume inside the storage device 7 as a logical volume is indicated to the server (service server 5) by the client (1). Furthermore, the term "schedule" refers to the timing at which the client (1) outputs respective job execution commands to the server (service server 5) for several jobs that have been registered in the client (1) by the user. For example, in a case where there are three jobs a, b and c that have been registered in the client 1, with a designated time of "x hours x minutes" being set as the output timing of the execution command in the case of job a, a time of "immediately" being set as the output timing of the execution command in the case of job b, and a time of "point in time of completion of the execution of job b" being set as the output timing of the execution command in the case of job c, the schedule for job a, job b and job c respectively comprises the designated time of "x hours x minutes", "immediately" and "point in time of completion of the job b". The schedule of the abovementioned jobs a, b and c can be freely set in accordance with the wishes of the user.

The schedule management part 15 manages the timing at which a given job registered in the client 1 is actually executed by the server (service server 5).

The execution managing part 17 receives notifications regarding the abovementioned schedule from the schedule management part 15, and actually performs the exchange of data with the server (service server 5) via the LAN 9. The execution managing part 17 performs management of the data format (protocol) of the data that is exchanged with the server (service server 5) via the LAN 9, address management of the server (service server 5) that is the partner in data exchange, control of the connections of the circuit (LAN 9), control relating to data transmission and reception, and the like.

The trouble recovery management part 19 maintains a standby state until there is a notification from the server (managing server 3) via the LAN 9 that there has been a recovery from the trouble (occurring in a logical volume of the storage device 7). Furthermore, when the abovementioned trouble recovery notification arrives from the server (managing server 3) via the LAN 9, the trouble recovery management part 19 receives this notification, and writes an indication of recovery from the trouble into the trouble information table 23.

The job information table 21 is a table that is used for schedule management by the schedule management part 15 of the respective jobs that the client 1 has (i.e., the respective jobs that are registered in the client 1). The job information table 21 is a table that accumulates various types of information such as the attributes (attribute information) of the respective jobs possessed by the client 1, the current processing states of the respective jobs, the contents of commands and the like. Furthermore, in the job information table, the contents of data are altered by the schedule management part 15 in accordance with the state transitions of the abovementioned respective jobs. The job information table will be described in detail later.

The trouble information table 23 holds a list of logical volumes in which trouble has occurred inside the storage device 7. The trouble information table 23 will also be described in detail later.

The managing server 3 is a server that is used to manage the construction information of the storage device 7, the presence or absence of trouble in logical volumes within the storage device 7 and the like. The managing server 3 comprises a trouble recovery receiving part 25, a trouble recovery management part 27, a received information table 29, and a construction information table 31. In cases where a request to notify the client 1 when there has been a recovery from trouble is output from the client 1 via the LAN 9 for a logical volume in which trouble has occurred within the storage device 7, the trouble recovery receiving part 25 receives this request.

When the trouble recovery receiving part 25 receives the abovementioned request from the client 1, the trouble recovery management part 27 samples the construction information of the storage device 7 via the SAN 11 at a specified timing. The trouble recovery management part 27 checks the states of logical volumes for which a notification of trouble recovery must be made by checking the abovementioned sampled construction information. Then, if the results of this check indicate that there has been a recovery from the trouble occurring in the abovementioned logical volume, the trouble recovery management part 27 notifies the client 1 of this via the LAN 9.

The received information table 29 holds identifying information for the respective logical volumes that is used to specify the logical volumes for which a notification of trouble recovery has been requested within the storage device 7, as well as address information for the respective clients (1) requesting notification of trouble recovery and the like. The received information table 29 will also be described in detail later.

The construction information table 31 is a table that is used by the managing server 3 to notify the client 1 if trouble has occurred in one of the logical volumes within the storage device 7. Specifically, the characterized in that 31 is a table that respectively shows the states of the respective physical volumes (whether the physical volumes are normal, or show the occurrence of trouble or the like) within the storage device 7, and the correspondence relationships between the respective physical volumes and respective logical volumes. In the construction information table 31, if the physical volumes corresponding to the logical volumes are normal, these are all judged to be "normal". The construction information table 31 is transmitted from the storage device 7 to the managing server 3 via the SAN 11.

The service server 5 is a server that is used to receive requests for job execution that are transmitted from the client 1 via the LAN 9, and to issue commands for the execution of these jobs to the storage device 7 via the SAN 11. The service server 5 comprises a service server execution managing part (execution managing part) 33, and a construction information table 35.

The execution managing part 33 is arranged so that this part can perform the processing required for job execution in cooperation with the execution managing part 17 on the side of the client 1. By analyzing commands transmitted from the execution managing part 17 on the side of the client 1 via the LAN 9, the execution managing part 33 issues job execution commands to the storage device 7 on the basis of the analysis results via the SAN 11.

The construction information table 35 is a table that is completely identical to the construction information table 31. Accordingly, a description of the details of the construction information table 35 will be omitted. The construction information table 35 is transmitted from the managing server 3 to the service server 5 via the LAN 9.

In the service server 5, in cases where the execution managing part 33 recognizes the failure of a job, the logical volume in which trouble has occurred is ascertained by referring to the construction information table 35, and information relating to the logical volume in which trouble has occurred is sent to the client 1 via the LAN 9.

As is shown in FIG. 1, the storage device 7 comprises a plurality of physical volumes (37, 39, 41, 43), and a plurality of logical volumes (45, 47, 49) which are formed with some of the abovementioned respective physical volumes (37, 39, 41, 43) assigned. The physical volumes 37, 39 and 41 are assigned to the logical volume 45, the physical volumes 39, 41 and 43 are assigned to the logical volume 47, and the physical volumes 41, 43, . . . are assigned to the logical volume 49.

In an actual storage device, numerous physical volumes are present rather than just the four physical volumes indicated by the symbols 37, 39, 41 and 43; furthermore, numerous logical volumes are also present, rather than just the three logical volumes indicated by the symbols 45, 47 and 49. Below, however, for convenience of description and graphic illustration, only the four physical volumes indicated by the symbols 37 through 43 and the three logical volumes indicated by the symbols 45 through 49 will be taken as an example.

Of course, the storage device 7 is not constructed only from the abovementioned physical volumes (37, 39, 41, 43) and the abovementioned logical volumes (45, 47, 49); this storage device 7 also comprises channel adapters, disk adapters, a shared memory, a cache memory and the like. In the present embodiment, however, since these parts do not relate directly to the gist of the present invention, a graphic illustration and detailed description of these parts will be omitted.

FIG. 2 is an explanatory diagram which shows one example of the job information table 21 possessed by the client 1 described in FIG. 1.

As was already described above, the job information table (21) is a table that accumulates various types of information such as the attributes (attribute information) of the respective jobs possessed by the client 1, the current processing states of the respective jobs, the contents of commands and the like. Specifically, as is shown in FIG. 2, the job information table 21 comprises a job name memory region 51 that is used to store numerous job names, a state memory region 53 that is provided for each job, and that is used to store respective job states, an execution command memory region 55 that is provided for each job, and that is used to store execution commands that have been issued for the respective jobs, and a resource name memory region 57 that is provided for each job, and that is used to store the names of resources (the names of logical volumes) that are used by the respective jobs.

For example, job 1, job 2, job 3, job 4, job 5 . . . constituting a plurality of jobs possessed by the client 1 shown in FIG. 1 are respectively stored in the job name memory region 51. In the state memory region 53, for example, "not yet executed" is stored as the state of job 1, "in execution" is stored as the state of job 2, "awaiting recovery from trouble" is stored as the state of job 3, "awaiting scheduling" is stored as the state of job 4, and "awaiting recovery from trouble" is stored as the state of job 5. In the execution command memory region 55, for example, "execution command" is respectively stored for jobs 1 through 5. In the resource name memory region 57, for example, "logical volume 2" is stored for job 1, "logical volume 1" is stored for job 2, "logical volume 2" is stored for job 3, "logical volume 1" is stored for job 4, and "logical volume 3" is stored for job 5.

The data contents of the job information table 21 can be alter by the schedule management part 15 in accordance with transitions in the actual states of the abovementioned respective jobs 1 through 5.

FIG. 3 is an explanatory diagram which shows one example of the trouble information table 23 possessed by the client 1 described in FIG. 1.

As was already described, the trouble information table 23 holds a list of the logical volumes in which trouble has occurred within the storage device 7; accordingly, in the present embodiment, for example, logical volume 2, logical volume 3, . . . are stored as the names of resources (names of logical volumes) in which trouble has occurred. Furthermore, in cases where new trouble occurs in logical volumes other than the abovementioned logical volumes 2 and 3, the logical volumes in which this trouble has occurred are also written into the trouble information table 23.

FIG. 4 is an explanatory diagram which shows one example of the received information table 29 possessed by the managing server 3 described in FIG. 1.

As was already described above, the received information table 29 holds identification information for the respective logical volumes that is used to specify the logical volumes or which notification of trouble recovery is required within the storage device 7, and which holds address information for the respective clients (1) requesting notification of trouble recovery. The received information table 29 comprises a resource name memory region 61 used to store the names of resources (names of logical volumes) for which notification of trouble recovery is required, and a client information memory region 63 used to store information indicating clients that request notification of trouble recovery. In the present embodiment, for example, the logical volume 2, logical volume 3, . . . are stored in the resource name memory region 61. The IP address 1 and port No. 1, and IP address 2 and port No. 2, are stored in the client information memory region 63 as client information corresponding to the logical volume 2, and the IP address 1 and port No. 1, IP address 4 and port No. 4 and IP address 3 and port No. 3 are stored as client information corresponding to the logical volume 3. Specified clients are indicated by these IP addresses and port Nos. Furthermore, the port Nos. indicate the receiving ports on the side of the respective clients (1).

FIG. 5 is an explanatory diagram showing one example of the construction information table 31 possessed by the managing server 3 described in FIG. 1, and one example of the construction information table 35 possessed by the service server 5 described in FIG. 1.

As was already described above, the construction information table 31 (35) is a table that is used by the managing server 3 to notify the client 1 if trouble has occurred in any logical volume within the storage device 7. The construction information table 31 (35) comprises a physical volume name memory region 71 that is used to store the respective physical volumes (1, 2, 3, 4, . . . ) within the storage device 7, a state memory region 73 that is provided for each physical volume (1, 2, 3, 4, . . . ) and that is used to store the states of the respective physical volumes (1, 2, 3, 4, . . . ), and a logical volume name memory region 75 that is set corresponding to the respective physical volumes (1, 2, 3, 4, . . . ) that are stored in the physical volume name memory region 71.

In the present embodiment, the physical volume 1 corresponds to the logical volume 1, and it is indicated that the state is normal; furthermore, the physical volume 2 corresponds to the logical volume 2 and logical volume 3, and it is indicated that trouble has occurred. Moreover, the physical volume 3 corresponds to the logical volume 2, logical volume 3 and logical volume 4, and it is indicated that the state is normal. Finally, the physical volume 4 corresponds to the logical volume 1 and logical volume 3, and it is indicated that the state is normal.

Figure 6:
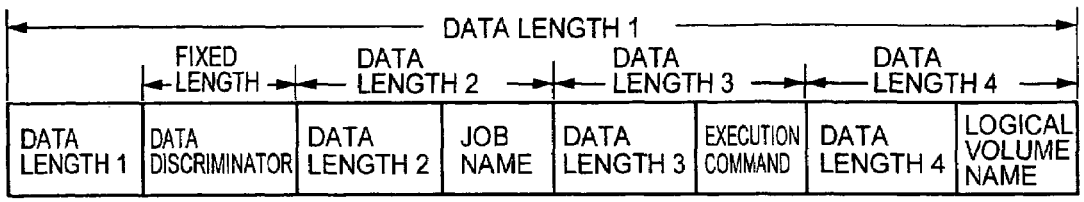
FIG. 6 is an explanatory diagram which shows one example of the job execution request data that is transmitted to the (execution managing part of) the service server from the execution managing part of the client in the information processing system described in FIG. 1.

FIG. 6 is an explanatory diagram which shows one example of the job execution request data that is transmitted to the (execution managing part 33 of the) service server 5 from the execution managing part 17 of the client 1 in the information processing system described in FIG. 1.

As is shown in FIG. 6, the job execution request data includes respective types of data such as the data length 1, data discriminator, data length 2, job name, data length 3, execution command, data length 4 and logical volume name. The data length 1 is data that expresses the overall amount of data in the job execution request data. The data discriminator is used to discriminate the job execution request data itself from (for example) other job execution request data, and is data of a fixed length. The data length 2 indicates the sum of the amount of data of the data length 2 itself and the amount of data of the job name. Data that is used for the concrete specification of the job (e.g., as in job a, job b, job c, . . . ) is registered in the job name. The data length 3 indicates the sum of the amount of data of the data length 3 itself and the amount of data of the execution command. Command contents that are issued to the storage device 7 by the execution managing part 33 of the service server 5 are registered in the execution command. The data length 4 indicates the sum of the amount of data of the data length 4 itself and the amount of data of the name of the logical volume involved in the execution of the abovementioned job.

Figure 7A:
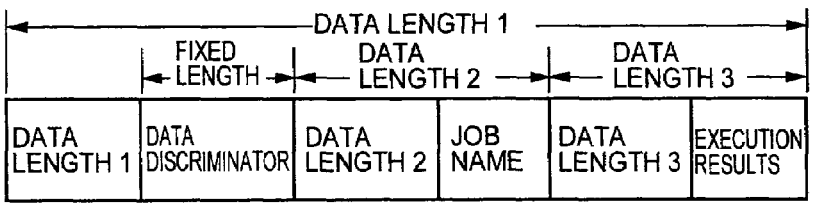
FIG. 7 is an explanatory diagram which shows one example of the job execution response data that is transmitted to the execution managing part of the client from the (execution managing part) of the service server in the information processing system described in FIG. 1.
Figure 7B:
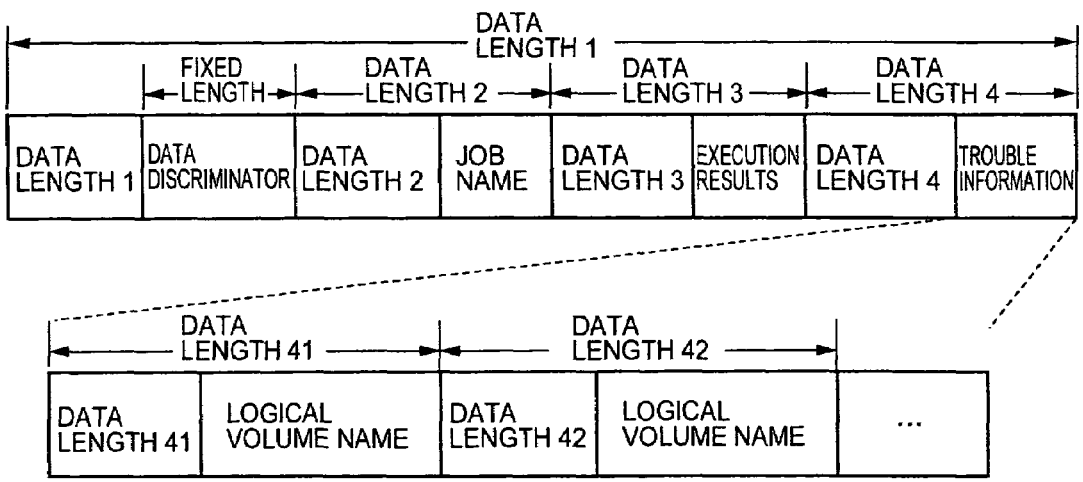

FIG. 7 is an explanatory diagram which shows one example of the job execution response data that is transmitted to the execution managing part 17 of the client 1 from the (execution managing part 33 of the) service server 5.

The job execution response data is classified into job execution response data used in cases where there is no trouble information (first job execution response data) as shown in FIG. 7 (a), and job execution response data that is used in cases where there is trouble information (second job execution response data) as shown in FIG. 7 (b).

As is shown in FIG. 7 (a), the first job execution response data includes respective data such as a data length 1, data discriminator, data length 2, job name, data length 3, and execution results. The data length 1, data discriminator, data length 2, job name and data length 3 are the same as in FIG. 6. Since no trouble has occurred in the logical volumes involved in the execution of this job, "normal completion" is registered in the execution results.

Meanwhile, as is shown in FIG. 7 (b), the second job execution response data includes respective data such as a data length 1, data discriminator, data length 2, job name, data length 3, execution results, data length 4 and trouble information. The data length 1, data discriminator, data length 2, job name and data length 3 are the same as in FIG. 6 and FIG. 7 (a). Since trouble has occurred in the logical volume involved in the execution of this job, "abnormal completion" (for example) is registered in the execution results. The data length 4 indicates the sum of the amount of data of the data length 4 itself and the amount of data of the trouble information. As is shown in FIG. 7 (b), the trouble information includes the data length 41, logical volume name, data length 42 and logical volume name, . . . . The data length 41 indicates the sum of the amount of data of the data length 41 itself and the amount of data of the name of the logical volume in which trouble has occurred. Similarly, the data length 42 also indicates the sum of the amount of data of the data length 42 itself and the amount of data of the name of the logical volume in which trouble has occurred. For example, the names of the abovementioned respective logical volumes in which trouble has occurred are written in by the execution managing part 33 of the service server 5.

Figure 8:
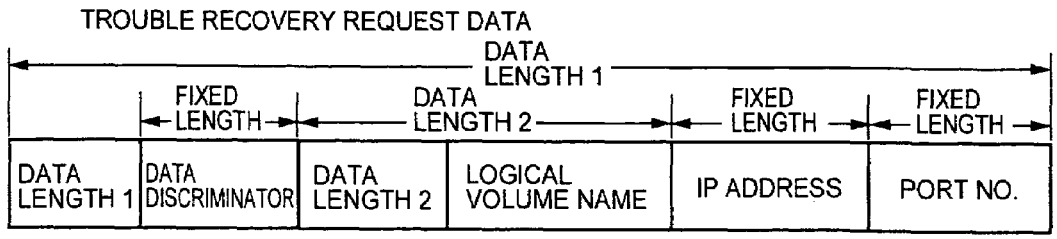
FIG. 8 is an explanatory diagram which shows one example of the trouble recovery request data that is transmitted to the (trouble recovery receiving part of the) managing server from the trouble recovery management part of the client in the information processing system described in FIG. 1.

FIG. 8 is an explanatory diagram which shows one example of the trouble recovery request data that is transmitted to the (trouble recovery receiving part 25 of the) managing server 3 from the trouble recovery management part 19 of the client in the information processing system described in FIG. 1.

As is shown in FIG. 8, the trouble recovery request data includes respective data such as a data length 1, data discriminator, data length 2, logical volume name, IP address and port No. The data length 1, data discriminator and data length 2 are the same as in FIG. 6 and FIG. 7. The name of the logical volume in which trouble has currently occurred, and for which notification of trouble recovery has been requested, is registered in the logical volume name. Furthermore, IP address information constituting address information for the respective clients (1) requesting notification of trouble recovery for this logical volume, and port No. information, are respectively registered as client information in the IP address and port No.

Figure 9:
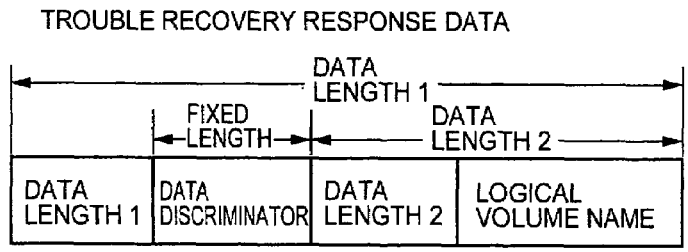
FIG. 9 is an explanatory diagram which shows one example of the trouble recovery response data that is transmitted to the trouble recovery management part of the client from the (trouble recovery management part of the) managing server in the information processing system described in FIG. 1.

FIG. 9 is an explanatory diagram which shows one example of the trouble recovery response data that is transmitted to the trouble recovery management part 19 of the client 1 from the (trouble recovery management part 27 of the) managing server 3 in the information processing system described in FIG. 1.

As is shown in FIG. 9, the trouble recovery response data includes respective data such as a data length 1, data discriminator, data length 2 and logical volume name. The data length 1, data discriminator and data length 2 are the same as in FIGS. 6, 7 and 8. The names of logical volumes that have recovered from trouble are registered in the logical volume name.

Figure 10:
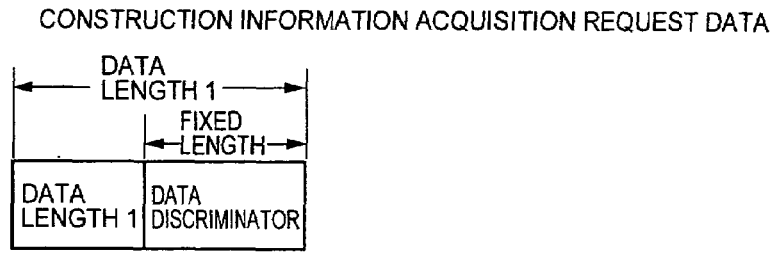
FIG. 10 is an explanatory diagram which shows one example of the construction information acquisition request data that is transmitted to the (trouble recovery management part of the) managing server from the execution managing part of the service server in the information processing system described in FIG. 1.

FIG. 10 is an explanatory diagram which shows one example of the construction information acquisition request data that is transmitted to the (trouble recovery management part 27 of the) managing server 3 from the execution managing part 33 of the service server 5 in the information processing system described in FIG. 1.

As is shown in FIG. 10, the construction information acquisition request data includes respective data such as a data length 1 and data discriminator. A detailed description of the data length 1 and data discriminator will be omitted.

Figure 11:
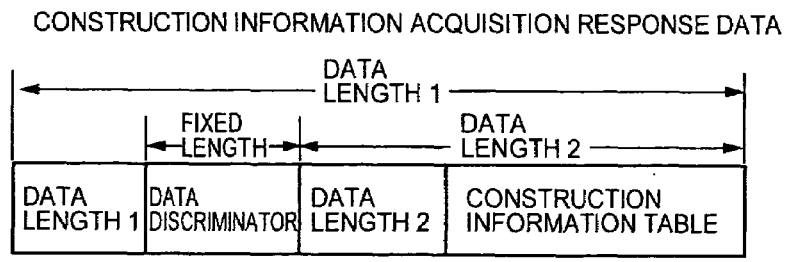
FIG. 11 is an explanatory diagram which shows one example of the construction information acquisition response data that is transmitted to the execution managing part of the service server from the (trouble recovery management part of the) managing server in the information processing system described in FIG. 1.

FIG. 11 is an explanatory diagram which shows one example of the construction information acquisition response data that is transmitted to the execution managing part 33 of the service server 5 from the (trouble recovery management part 27 of the) managing server 3 in the information processing system described in FIG. 1.

As is shown in FIG. 11, the construction information acquisition response data includes respective data such as a data length 1, data discriminator, data length 2 and construction information table. A detailed description of the data length 1, data discriminator and data length 2 will be omitted. A construction information table 31 (35) such as that shown in FIG. 5, which is transmitted from the storage device 7, is registered in the construction information table.

Figure 12:
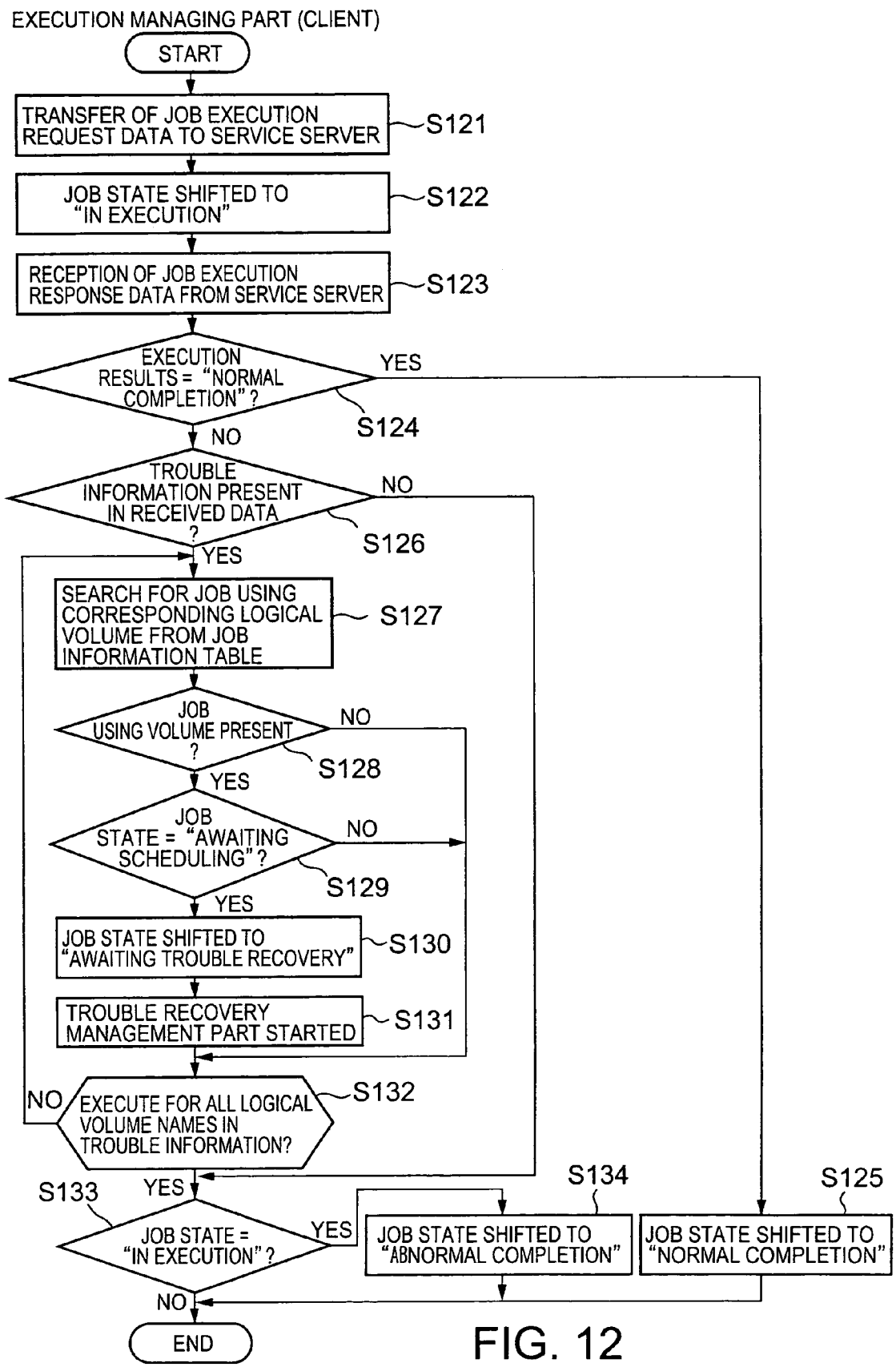
FIG. 12 is a flow chart which shows mainly the processing operation that is performed by the execution managing part of the client in the information processing system described in FIG. 1.

FIG. 12 is a flow chart which shows the processing operation that is performed mainly by the execution managing part 17 of the client 1 in the information processing system described in FIG. 1.

In FIG. 12, the execution managing part 17 of the client 1 first transmits job execution request data (such as that shown in FIG. 6) regarding a specified job of the client 1 to the service server 5 (step S121). When this processing operation is completed, the "state" of this job in the job information table 21 shown in FIG. 2 is altered to "in execution" by the schedule management part 15 (step S122) Next, when job execution response data such as that shown in FIG. 7 is transmitted from the service server 5, the execution managing part 17 receives this job execution response data. If no trouble has occurred in the logical volumes involved in the execution of this job, i.e., if the trouble information is "none", then job execution response data having the data construction shown in FIG. 7 (*a*) is transmitted from the service server 5. On the other hand, if trouble has occurred in the logical volumes involved in the execution of this job, i.e., if the trouble information is "present", then job execution response data having the data construction shown in FIG. 7 (*b*) is transmitted from the service server 5 (step S123).

Next, by checking the abovementioned received job execution response data, the execution managing part 17 makes a judgement as to whether or not the "execution results" in the job execution response data are "normal completion" (step S124). If these judgement results are "normal completion" (YES in step S124), the schedule management part 15 alters the "state" relating to this job in the job information table 21 to "normal completion" (step S125), and the series of processing operations is ended.

On the other hand, if the abovementioned judgement results are not "normal completion" (NO in step S124), the execution managing part 17 checks whether or not there is trouble information in the received job execution response data (step S126). If it is judged as a result of this check that trouble information is present in the received job execution response data (YES in step S126), the schedule management part 15 performs a search of the job information table 21 in order to ascertain if there are other jobs (besides the abovementioned job) using the logical volume in which the abovementioned trouble has occurred (step S127). In cases where it is judged as a result of this search that there are other jobs using the abovementioned logical volume in which trouble has occurred (YES in step S128), the schedule management part 15 performs a check in order to ascertain whether or not the "state" of the other job using the abovementioned logical volume is "awaiting scheduling" (step S129). If it is judged as a result of this check that the state is "awaiting scheduling" (YES in step S129), then the schedule management part 15 starts the trouble recovery management part 19 (step S131) after altering the "state" of the abovementioned job in the job information table 21 to "awaiting recovery from trouble" (step S130). As a result, the trouble recovery management part 19 maintains a standby state until there is a notification from the managing server 3 that there has been a recovery from the trouble occurring in the abovementioned logical volume. Then, when the abovementioned notification of recovery from trouble arrives from the managing server 3, the trouble recovery management part 19 receives this notification, and writes an indication that there has been a recovery from the abovementioned trouble into the trouble information table 23.

In cases where it is judged that there is no trouble information in the received job execution response data (NO in step S126), the execution managing part 17 immediately shifts to the processing operation shown in step S133. Furthermore, in cases where no job (besides the abovementioned job) using the logical volume in which the abovementioned trouble has occurred is found in the job information table 21 (NO in step S128), the execution managing part 17 immediately shifts to the processing operation shown in step S132. The execution managing part 17 also immediately shifts to the processing operation shown in step S132 in cases where the "state" of another job using the logical volume in which the abovementioned trouble has occurred is not "awaiting scheduling" (NO in step S129).

Next, a check is made in order to ascertain whether or not the processing operation indicated in step S127 through step S131 has been performed for all of the logical volumes deemed to have trouble (trouble information "present") in the received job execution response data (step S132). If it is found as a result of this check that the processing operation has not been performed for all of the logical volumes deemed to have trouble (NO in step S132), the processing returns to the processing operation shown in step S127. On the other hand, if it is found as a result of the abovementioned check that the abovementioned processing operation has been performed for all of the logical volumes deemed to have trouble (YES in step S132), the schedule management part 15 checks whether or not the "state" of the abovementioned other jobs in the job information table 21 is "in execution" (step S133). In cases where it is judged as a result of this check that the abovementioned state is "in execution" (YES in step S133), the schedule management part 15 alters the "state" of the abovementioned other jobs in the job information table 21 to "abnormal completion" (step S134). As result, the series of processing operations is ended.

In cases where it is judged as a result of the abovementioned check that the abovementioned state is not "in execution" (NO in step S133), the series of processing operations is ended as a result.

Figure 13:
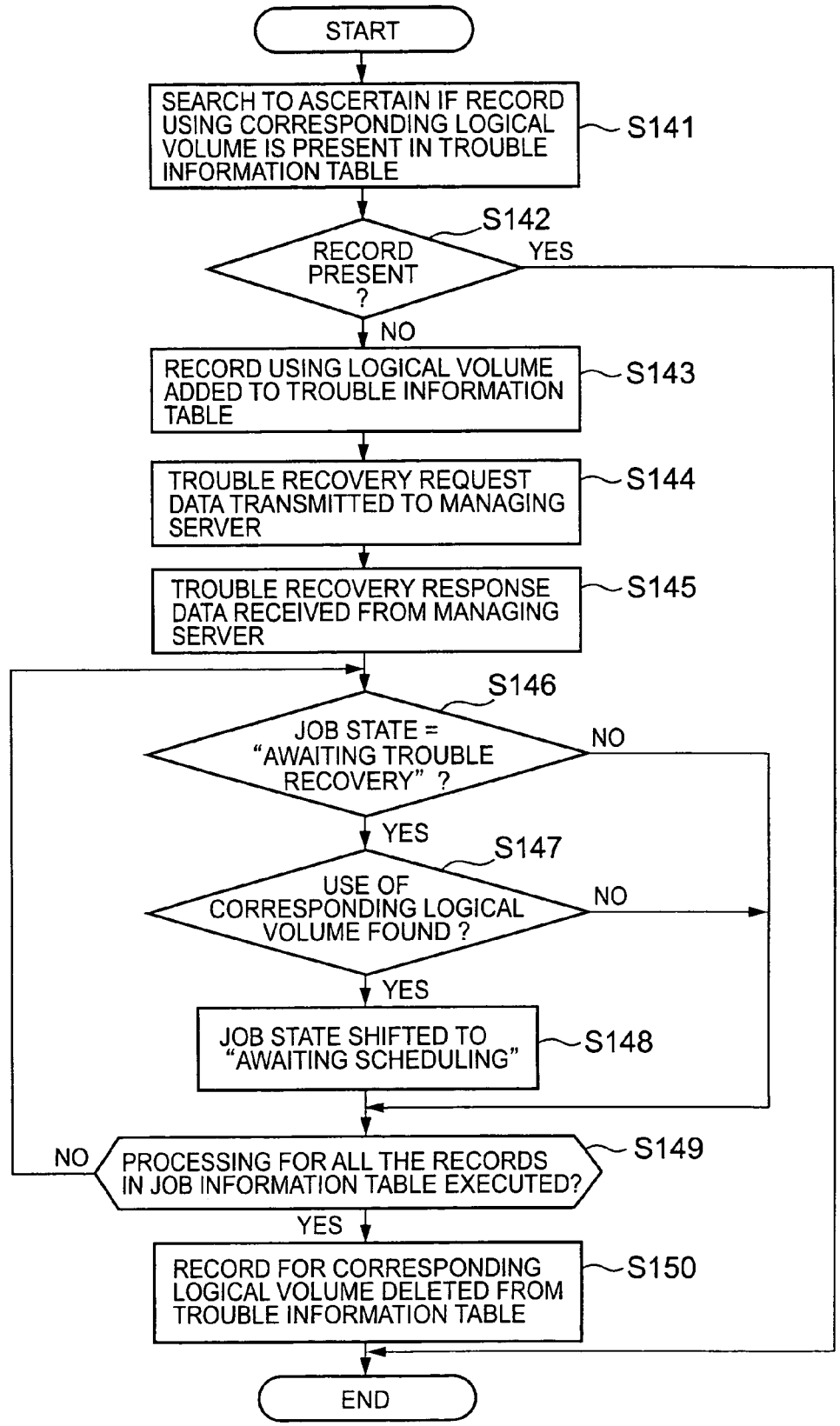
FIG. 13 is a flow chart which shows the processing operation that is performed by the trouble recovery management part of the client in the information processing system described in FIG. 1.

FIG. 13 is a flow chart which shows the processing operation that is performed by the trouble recovery management part 19 of the client 1 in the information processing system described in FIG. 1.

As was described in the flow chart shown in FIG. 12, the trouble recovery management part 19 of the client 1 is placed in a started state as a result of the "state" of the other jobs using the logical volume in which trouble has occurred in the job information table 21 being altered from "awaiting scheduling" to "awaiting recovery from trouble" by the schedule management part 15.

Specifically, in FIG. 13, the trouble recovery management part 19 first performs a search in order to ascertain whether or not records (rows) using the logical volume in question (i.e., records using the logical volume used by the other jobs described in the flow chart shown in FIG. 12) are present in the trouble information table 23 shown in FIG. 3 (step S141). If it is found as a result of this search that records using the abovementioned logical volume are not present (NO in step S142), the trouble recovery management part 19 additionally registers a record using the abovementioned logical volume in the trouble information table 23 (step S143).

Next, trouble recovery request data such as that shown in FIG. 8 is transmitted to the managing server 3 (step S144). As a result, when trouble recovery response data such as that shown in FIG. 9 is transmitted from the managing server 3, this trouble recovery response data is received (step S145). the schedule management part 15 refers to the job information table 21, and checks whether or not the "state" of the abovementioned other jobs is "awaiting recovery from trouble" (step S146). If it is found as a result of this check that the "state" of the abovementioned other jobs is "awaiting recovery from trouble" (YES in step S146), then the trouble recovery management part 19 checks whether or not the corresponding logical volume is currently being used (step S147). Then, in cases where the trouble recovery management part 19 judges that the corresponding logical volume is currently being used (YES in step S147), the schedule management part 15 alters the "state" of the abovementioned other jobs in the job information table 21 to "awaiting scheduling" (step S148).

Next, a check is made in order to ascertain whether or not the processing operation shown in steps S146 through S148 has been performed for all of the records (records using logical volumes) in the job information table 21 (step S149). If it is found as a result of this check that the abovementioned processing has not been performed for all of the records using the abovementioned logical volumes (NO in step S149), the processing returns to the processing operation shown in step S146. On the other hand, if it is found as a result of this check that the abovementioned processing has been performed for all or the records using the abovementioned logical volumes (YES in step S149), the trouble recovery management part 19 performs processing that deletes the records using the corresponding logical volumes (i.e., the records using logical volumes in which trouble has not occurred, and which are currently being used for job execution) from the trouble information table 23 (step S150). As result, this series of processing operations is ended.

In cases where it is found as a result of the abovementioned search that records using the abovementioned logical volumes are present (YES in step S142), the series of processing operations is immediately ended. Furthermore, in cases where the "state" of the abovementioned other jobs is not "awaiting recovery from trouble" (NO in step S146), or in cases where the trouble recovery management part 19 judges that the corresponding logical volume is not currently being used (No in step S147), the processing is shifted to the processing operation shown in step S149.

Figure 14:
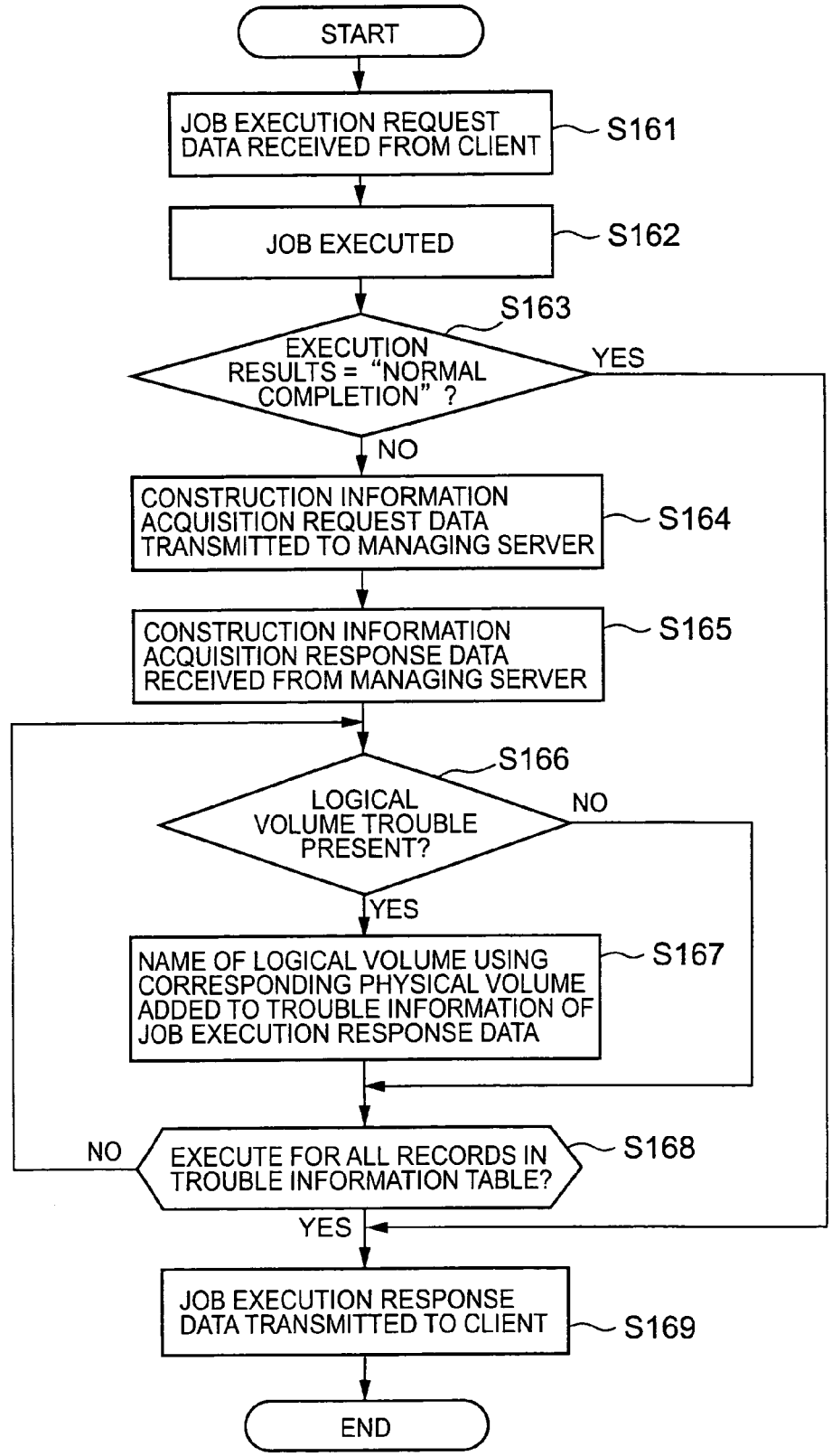
FIG. 14 is a flow chart which shows the processing operation that is performed by the execution managing part of the service server in the information processing system described in FIG. 1.

FIG. 14 is a flow chart which shows the processing operation that is performed by the execution managing part 33 of the service server 5 in the information processing system described in FIG. 1.

In FIG. 14, when job execution request data such as that shown in FIG. 6 is transmitted from the client 1, the execution managing part 33 of the service server 5 receives this job execution request data (step S161), and executes the job on the basis of this job execution request data (step S162). Specifically, the execution managing part 33 analyzes the commands (job execution request data) that are transmitted from the execution managing part 17 on the side of the client 1, and issues job execution commands to the storage device 7 on the basis of the results of this analysis.

Next, the execution managing part 33 judges whether or not the "execution results" of the abovementioned job in the storage device 7 are "normal completion" (step S163). If it is found as a result of this judgement that the execution results are not "normal completion" (NO in step S163), the execution managing part 33 transmits construction information acquisition request data such as that shown in FIG. 10 to the managing server 3 in order to request the provision of the construction information held by the managing server 3 (step S164). Then, when construction information acquisition response data such as that shown in FIG. 11 is transmitted from the managing server 3 that has received this construction information acquisition request data, the execution managing part 33 receives this construction information acquisition response data (step S165).

Next, by referring to the construction information table 31 (35) (shown in FIG. 5) in the abovementioned received construction information acquisition response data, the execution managing part 33 checks whether or not trouble has occurred in any of the physical volumes making up the storage device 7 (step S166).

If it is judged as a result of this check that trouble has occurred in any of the physical volumes (YES in step S166), the execution managing part searches the construction information table 31 (35) for the names of logical volumes using the physical volume in question (i.e., the physical volume in which trouble has occurred), and additionally registers the names of logical volumes that are found in the trouble information contained in the job execution response data shown in FIG. 7 (*b*) (step S167).

Next, a check is made in order to ascertain whether or not the processing operation shown in steps S166 and S167 has been performed for all of the records (records using logical volumes) contained in the construction information table 31 (35) (step S168). If it is found as a result of this check that the abovementioned processing has not been performed for all of the abovementioned records using the logical volumes (NO in step S168), the processing returns to the processing operation shown in step S166. On the other hand, if it is found as a result of the abovementioned check that the abovementioned processing has been performed for all of the abovementioned records using the logical volumes (YES in step S168), the execution managing part 33 transmits the job execution response data produced in step S167 to the client 1 (step S169), and the series of processing operations is ended.

If it is found as a result of a check being made by reference to the abovementioned construction information table 31 (35) that no trouble has occurred in any of the physical volumes (NO in step S166), the processing is shifted to the processing operation shown in step S168. Furthermore, if the "execution results" of the abovementioned job in the storage device 7 are "normal completion" (YES in step S163), the execution managing part 33 transmits the additional registration of "normal completion" in the "execution results" contained in the job execution response data shown in FIG. 7 (*a*) to the client 1 as job execution response data (step S169), and the series of processing operations is ended.

Figure 15:
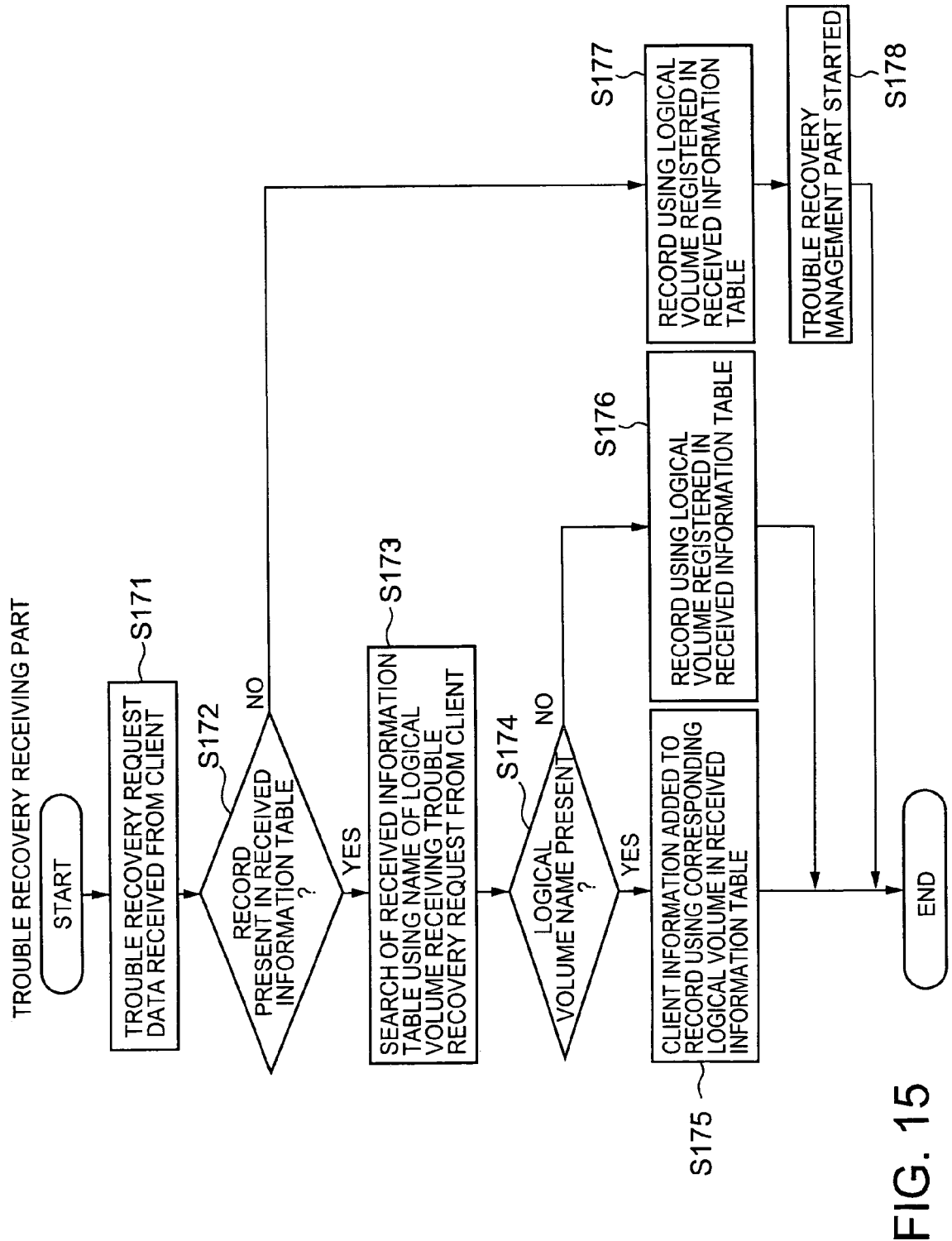
FIG. 15 is a flow chart which shows the processing operation that is performed by the trouble recovery receiving part of the managing server in the information processing system described in FIG. 1.

FIG. 15 is a flow chart which shows the processing operation that is performed by the trouble recovery receiving part 25 of the managing server 3 in the information processing system described in FIG. 1.

In FIG. 15, when trouble recovery request data such as that shown in FIG. 8 is transmitted from the client 1, the trouble recovery receiving part 25 of the managing server 3 receives this trouble recovery request data (step S171). Next, the trouble recovery receiving part 25 checks whether there are any records using logical volumes in the received information table 29, or whether no such records are present (step S172). If it is judged as a result of this check that there are records using logical volumes (YES in step S172), the trouble recovery receiving part 25 performs a check in order to ascertain whether or not records using logical volumes set in the abovementioned trouble recovery request data are present in the received information table 29 (step S173). If it is found as a result of the abovementioned check there are records using the abovementioned logical volumes in the received information table 29 (YES in step S174), the trouble recovery receiving part 25 additionally registers address information (IP address information and port No. information) (i.e., client information) for the respective clients (1) requesting notification of recovery from trouble for the abovementioned logical volumes in the records using the abovementioned logical volumes contained in the received information table 29 (step S175). As a result, the series of processing operations is ended.

If it is found as a result of checking the received information table 29 that there are no records using the abovementioned logical volumes in the received information table 29

(NO in step S174), the trouble recovery receiving part 25 registers the records using the abovementioned logical volumes (including the abovementioned client information) in the received information table 29 (step S176), and the series of processing operations is ended.

If the trouble recovery receiving part 25 judges (as a result of checking the received information table 29) that there is not a single record using a logical volume in this received information table (NO in step S172), the trouble recovery receiving part 25 registers the names of the logical volumes contained in the abovementioned trouble recovery request data that is received from the client 1 in the received information table 29 (step S177). Then, after the trouble recovery management part 27 is started (step S178), the series of processing operations is ended.

Figure 16:
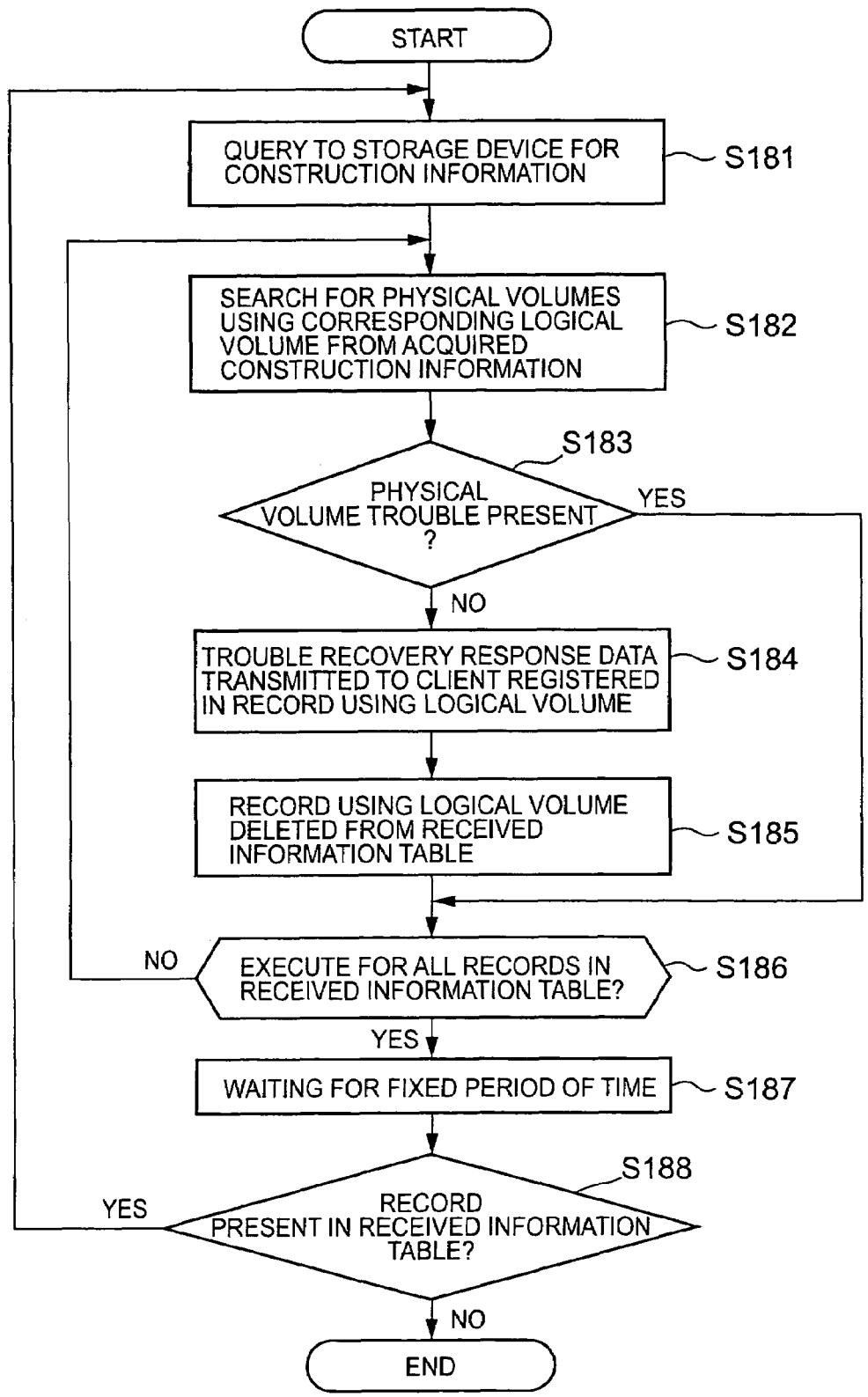
FIG. 16 is a flow chart which shows the processing operation that is performed by the trouble recovery management part of the managing server in the information processing system described in FIG. 1.

FIG. 16 is a flow chart which shows the processing operation that is performed by the trouble recovery management part 27 of the managing server 3 in the information processing system described in FIG. 1.

As was already described, the trouble recovery management part 27 of the managing server 3 is started by the trouble recovery receiving part 25. In FIG. 16, the trouble recovery management part 27 requests the acquisition of the content construction information shown in FIG. 5 from the storage device 7 (step S181). When construction information is transmitted from the storage device 7 in response to this request, the trouble recovery management part 27 receives this construction information. Then, utilizing the abovementioned construction information, a search is made for physical volumes used by the logical volumes for which notification has been received from the trouble recovery receiving part 25 (step S182). Next, a check is made in order to ascertain whether or not trouble has occurred in the physical volumes that are found in the abovementioned search (step S183). If it is found as a result of this check that no trouble has occurred in the physical volumes found in the abovementioned search (NO in step S183), these physical volumes are used. The trouble recovery management part 27 respectively transmits trouble recovery response data such as that shown in FIG. 9 to the respective clients (1) registered in the records using logical volumes contained in the received information table 29 (step S184). Next, the records using logical volumes relating to the abovementioned logical volumes are deleted from the received information table 29 (step S185).

Next, a check is made in order to ascertain whether or not the processing operation shown in steps S182 through S185 has been performed for all of the records (records using logical volumes) contained in the received information table 29 (step S186). If it is found as a result of this check that the abovementioned processing has not been performed for all of the abovementioned records using logical volumes (NO in step S186), the processing returns to the processing operation shown in step S182. On the other hand, if it is found as a result of the abovementioned check that the abovementioned processing has been performed for all of the abovementioned records using logical volumes (YES in step S186), the trouble recovery management part 27 makes a check in order to ascertain whether or not there are records using logical volumes in the received information table 29 (step S188), after maintaining a standby state for a fixed period of time (step S187). If it is found as a result of this check that records using logical volumes are present (YES in step S188), the processing returns to the processing operation shown in step S181. On the other hand, if it is found as a result of this check that there are no records using logical volumes in the received information table 29 (NO in step S188), the series of processing operations is ended.

Furthermore, if trouble has occurred in the physical volumes found in the abovementioned search (YES in step S183), the processing is immediately shifted to the processing operation shown in step S186.

Preferred embodiments of the present invention have been described above. However, these embodiments are examples that are used to illustrate the present invention; the scope of the present invention is not limited to these embodiments alone. The present invention can be worked in various other aspects.

What is claimed is:

1. A job execution managing system comprising:
    a storage device which has a plurality of physical volumes, and which is used with the physical volumes respectively assigned to a plurality of logical volumes; and
    an information processing device which instructs said storage device to execute a job comprising job steps;
    a trouble detection part which detects whether or not trouble has occurred in said respective logical volumes; and
    a logical volume searching part which, when said trouble detection part has detected that trouble has occurred in the logical volume used in the execution of the job as a result of the execution of the job being instructed by said information processing device, searches for another logical volume to which the physical volume contained in said logical volume has been assigned,
    wherein the information processing device comprises a client and a server, and a command for the execution of the job is sent during execution to the storage device from the client via the server,
    wherein the client comprises:
        a schedule registration part configured to register a schedule, the schedule being a timing at which the client outputs, to the server, the command for the execution of the job; and
        a schedule management part configured to manage the execution of the job steps by the server based at least in part on the schedule, managing the execution of the job steps comprising managing at which timing the job relating to the schedule registered in the schedule registration part is executed by the server and generating a notification relating at least in part to the schedule; and
        an execution management part configured to:
            receive the notification from the schedule management part; and
            exchange data with the server based at least in part on the job steps.

2. The job execution managing system according to claim 1, further comprising:
    a job searching part which searches for other jobs using the logical volume found by said logical volume searching part; and
    an execution stop notification part which, when said job searching part finds another job, notifies said information processing device of the stopping of the execution of this other job.

3. The job execution managing system according to claim 1, further comprising:
    a trouble recovery detection part which detects whether or not there has been a recovery from the trouble occurring in said logical volume; and
    an execution stop release notification part which, when said trouble recovery detection part detects trouble recovery of said logical volume, notifies said information processing device of the release of the stopping of the execution of said other job.

4. The job execution managing system according to claim 2, wherein said trouble detection part, said job searching part and said execution stop notification part are all installed in the server.

5. The job execution managing system according to claim 4, wherein a notification from said execution stop notification pat is sent to the client.

6. The job execution managing system according to claim 3, wherein said trouble recovery detection part and said execution stop release notification part are installed in the server.

7. The job execution managing system according to claim 6, wherein a notification from said execution stop release notification part is sent to the client.

8. A job execution managing method comprising preparing:

a storage device which has a plurality of physical volumes, and which is used with the respective physical volumes respectively assigned to a plurality of logical volumes; and an information processing device which instructs said storage device to execute a job, wherein the information processing device comprises a client and a server, and a command for the execution of the job is sent to the storage device from the client via the server, wherein the client comprises:

a schedule registration part configured to register a schedule, the schedule being a timing at which the client outputs, to the server, the command for the execution of the job; and a schedule management part configured to manage the execution of the job steps by the server based at least in part on the schedule, managing the execution of the job steps comprising managing at which timing the job relating to the schedule registered in the schedule registration part is executed by the server and generating a notification relating at least in part to the schedule; and an execution management part configured to:

receive the notification from the schedule management part, and exchange data with the server based at least in part on the job steps, and wherein the method further comprises the steps of:

detecting whether or not trouble has occurred in said respective logical volumes; and when it is detected in said trouble detection step that trouble has occurred in the logical volume used in the execution of a job as a result of the execution of the job being instructed by said information processing device, searching for another logical volume to which the physical volume contained in said logical volume has been assigned.

9. The job execution managing method according to claim 8, further comprising the steps of:

searching for other jobs using the logical volume found in said logical volume searching step; and when such other job is found in said job searching step, notifying the information processing device of the stopping of the execution of the other job.

10. The job execution managing method according to claim 8, further comprising the steps of:

detecting whether or not there has been a recovery from the trouble occurring in said logical volume; and when trouble recovery of the above mentioned of the logical volume is detected in said trouble recovery detection step, notifying said information processing device of the release of the stopping of the execution of said other jobs.

\* \* \* \* \*

UNITED STATES PATENT AND TRADEMARK OFFICE
CERTIFICATE OF CORRECTION

PATENT NO.         : 7,421,613 B2
APPLICATION NO. : 10/928011
DATED                  : September 2, 2008
INVENTOR(S)        : Hironobu Nakaya It is certified that error appears in the above-identified patent and that said Letters Patent is hereby corrected as shown below:

Title Page:

In the bibliographic data, at code (75),

"Inventors:   Hironobu Nakaya, Tokyo (JM)"

Should read,

--Inventors:   Hironobu Nakaya, Yokohama (JP)--

Signed and Sealed this

Twenty-first Day of April, 2009

JOHN DOLL
*Acting Director of the United States Patent and Trademark Office*